Dec. 14, 1954  J. REHAK ET AL  2,696,635
CONTINUOUS MIXING MILL FOR PLASTIC MATERIALS
Filed Sept. 13, 1951  4 Sheets-Sheet 3
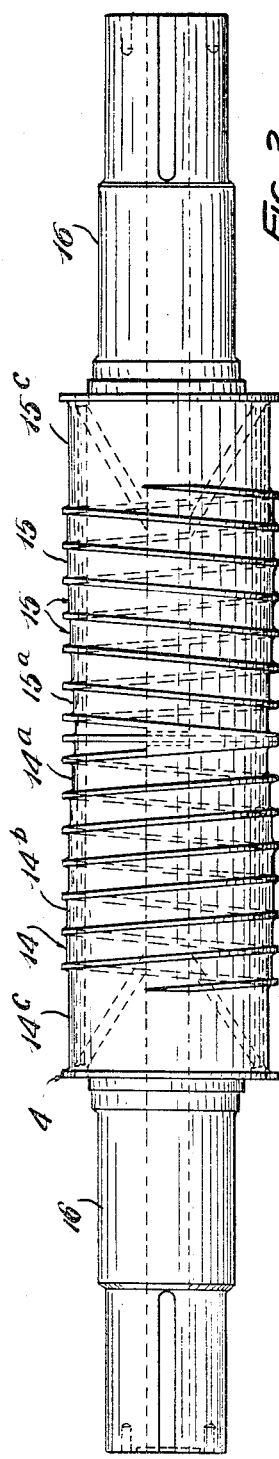
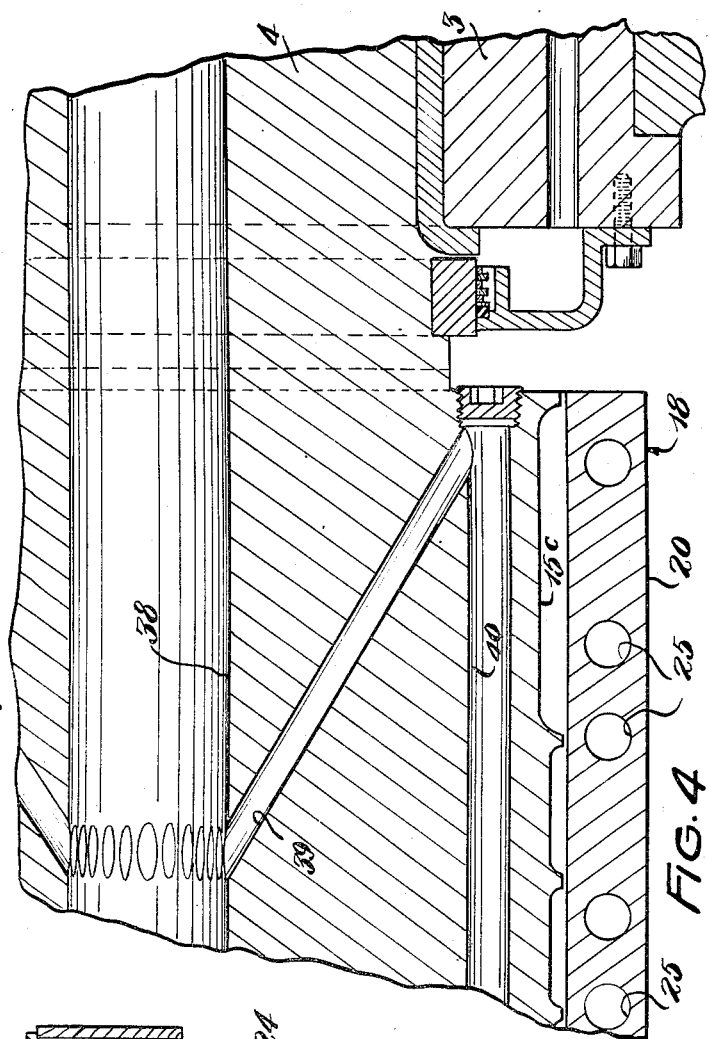
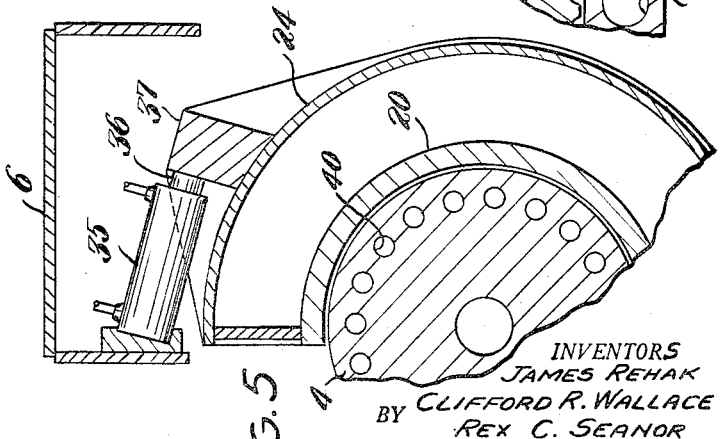
INVENTORS
JAMES REHAK
CLIFFORD R. WALLACE
BY REX C. SEANOR
Oldham & Oldham
ATTORNEYS

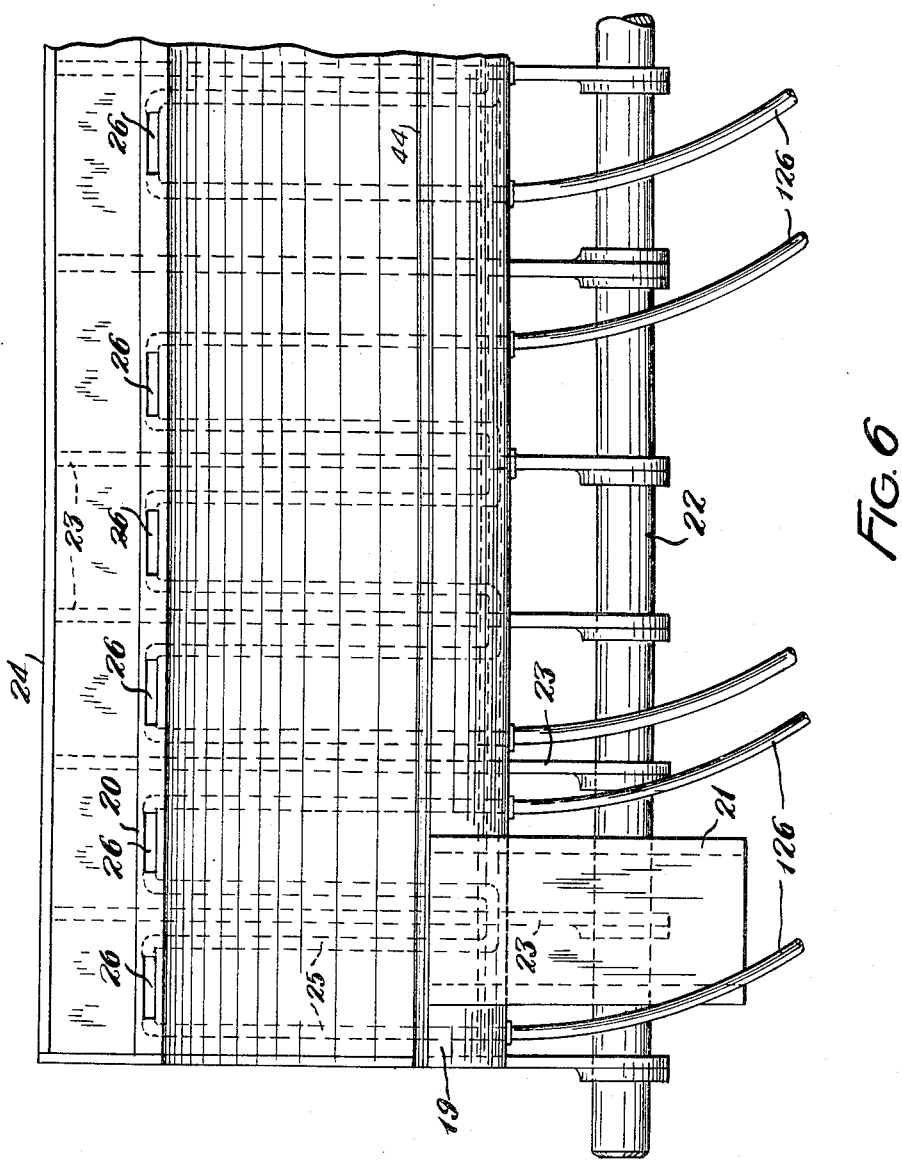

United States Patent Office 2,696,635
Patented Dec. 14, 1954

2,696,635

CONTINUOUS MIXING MILL FOR PLASTIC MATERIALS

James Rehak, Cicero, Ill., and Clifford R. Wallace, Paris, and Rex C. Seanor, Akron, Ohio, assignors to Adamson-United Company, Akron, Ohio, a corporation of Ohio Application September 13, 1951, Serial No. 246,442

4 Claims. (Cl. 18—2)

This invention relates to continuous mixing mills, and particularly to automatic mixing mills for continuous, or batch mastication, plasticizing or compounding and discharge of plastic material, such as natural rubber, or other plastic materials.

Heretofore, rubber has been masticated and compounded conventionally, in most instances in rubber and other similar factories by being passed between the "bight" or "nip" formed between a pair of metal rolls that are positioned horizontally and journaled in adjacent but spaced relation with each other. The rubber is worked by being passed repeatedly between the bight formed between two rolls from a bank of rubber on top of the rolls. Such mixing may involve the addition of dry or oily compounding ingredients with the basic rubber component of the rubber being processed, or it may involve the addition of compounded or uncompounded rubber to rubber that may have some compounding ingredients already present therein. In all events, normally such mixing of the rubber occurs as a batch operation.

In some instances, rubber is mixed or processed in a socalled "internal mixer" which is a machine comprising a pair of rotors totally enclosed in a casing, but this type of a machine is also a batch machine and can normally be used to add only a small part of the compounding ingredients to a given rubber batch when present in such internal mixture. This is because the temperatures reached in such mixtures are so high that the vulcanizing ingredients must be added to the rubber as a separate operation.

In most rubber factories today, a large quantity of the rubber used by such factory is first initially mixed with the desired compounding and vulcanizing ingredients, after which the batch is taken from the mixing mill in the form of small rectangular sheets about three feet by six feet in size and the rubber is stored until it is desired to be used. At such time, the rubber then must be placed upon a so-called "warm-up" mill and be processed in such mill for a short time to work such rubber into a desired plastic composition after which the rubber can be discharged from the mill as a small continuous strip, if desired, or it can be otherwise removed from the mill for immediate use.

All of such mixing or warm-up operations usually require the constant presence of a worker at each mill since the position of the rubber with relation to the mill must be varied manually in most instances to obtain proper and thorough mixing of the rubber being processed. Normally the rubber on such mills will initially merely pass through the bight between the pair of rolls and must be manually picked up from a spot underneath the rolls and be placed on top of the rolls for passage through the bight again. After several of such passes, the rubber becomes plasticized sufficiently so that the rubber will form into a sheet which is wrapped around the working roll of the pair of mixing rolls. Again, however, the operator must control such rubber sheet upon a working roll and cause the rubber to be uniformly distributed along the length of the roll and be moved from end to end of the roll occasionally to obtain desired uniformity in the resultant plasticized rubber. Usually such mixing is effected by manually making a slanting cut in the rubber sheet being processed in the pair of rolls with the operator of the mill rolling up the rubber into a gradually lengthening cylindrical roll with one hand while he is cutting the rubber sheet with his other hand. The specific type of mixing operations performed depends upon the amount of rubber being processed, the degree of difficulty in obtaining uniformity in the mixture being processed, the ingredients being added to the rubber, et cetera.

Obviously the manual processing and mixing of rubber is a relatively costly operation and the two different plasticizing and mixing operations performed upon nearly all rubber processed are likewise objectionable practices which not only require appreciable storage space for the rubber intermediate its initial processing and ultimate use, but which likewise are costly and time consuming operations.

Heretofore some types of continuous mixing and discharge apparatus have been suggested and one illustration of apparatus of that type is shown in Brown U. S. Patent No. 2,264,237.

It will be realized that there are many mills in operation in rubber factories today and that such mills represent a huge cost so that even if it were desired to replace such mills with a continuous type of automatic mixing mill, such as is shown in the above-identified patent, it would be so costly to replace all of such mills that many years would elapse before even the major percentage of such mills could be converted into continuous mixing mills of the type referred to in said patent.

It is the general object of the present invention to provide a new and improved type of a continuous, automatic mixing mill for plastic or rubberlike materials, which machine is characterized by its ability to be built up from a conventional mixing mill with a minimum of cost and alteration of the basic conventional pair of mill rolls.

Another object of the invention is to provide a new and improved type of a continuous mixing mill which can be used for batch operation, if desired.

Another object of the invention is to provide a mixing mill wherein means are provided for changing the mixing action effected by the machine with movement of the rubber axially of the mill towards the discharge end thereof.

Another object of the invention is to provide means for controlling the operative temperatures at different axially spaced mixing portions or sections of the apparatus of the invention.

Another object of the invention is to provide a novel, improved type of a retainer member for retaining rubber automatically in engagement with a working roll of a mixing mill.

Still another object of the invention is to provide a novel lock means for retaining a pivotal rubber retaining casement in association with a working roll of a mixing mill, and for breaking such casement away from the working roll when desired.

A further object of the invention is to correlate the operative temperature of a continuous mixing mill wherein rubber is moved axially of the mill with the processing thereof with varied working or masticating conditions set up in the mill at different axially spaced portions thereof.

A further object of the invention is to provide a continuous discharge mixing mill of the general class described wherein a two piece casement is provided for association with a grooved working roll of the apparatus and wherein the casement comprises one relatively short fixedly positioned section and one relatively long, pivotally positioned section adapted for pivotal movement away from operative association with the grooved roll to facilitate cleaning the apparatus of the invention.

Another object of the invention is to provide a strong, sturdy, casement which is of relatively inexpensive cost and which has cooling circuits provided therein.

Another important object of the invention is to provide a continuous type of mixing mill wherein no end thrust exists in the working roll of the apparatus.

Still another object of the invention is to provide apparatus of the class described wherein there is no leakage of material fed into the apparatus for processing at the inlet portion thereof.

The foregoing and other objects and advantages of the invention will be made more apparent as the specification proceeds.

For a better understanding of the invention, reference should be had to the accompanying drawings wherein one currently known preferred embodiment of the invention is disclosed and wherein:

Fig. 3 is an elevation of the working roll of the apparatus of Fig. 1;

Fig. 4 is a fragmentary enlarged longitudinal section taken through a portion of the working roll of the apparatus showing the casement operatively associated therewith;

Fig. 5 is a fragmentary vertical section showing the means used to break the casement from engagement with the working roll; and Fig. 6 is an elevation of the casement especially showing the cooling circuits provided therein.

Figure 1:
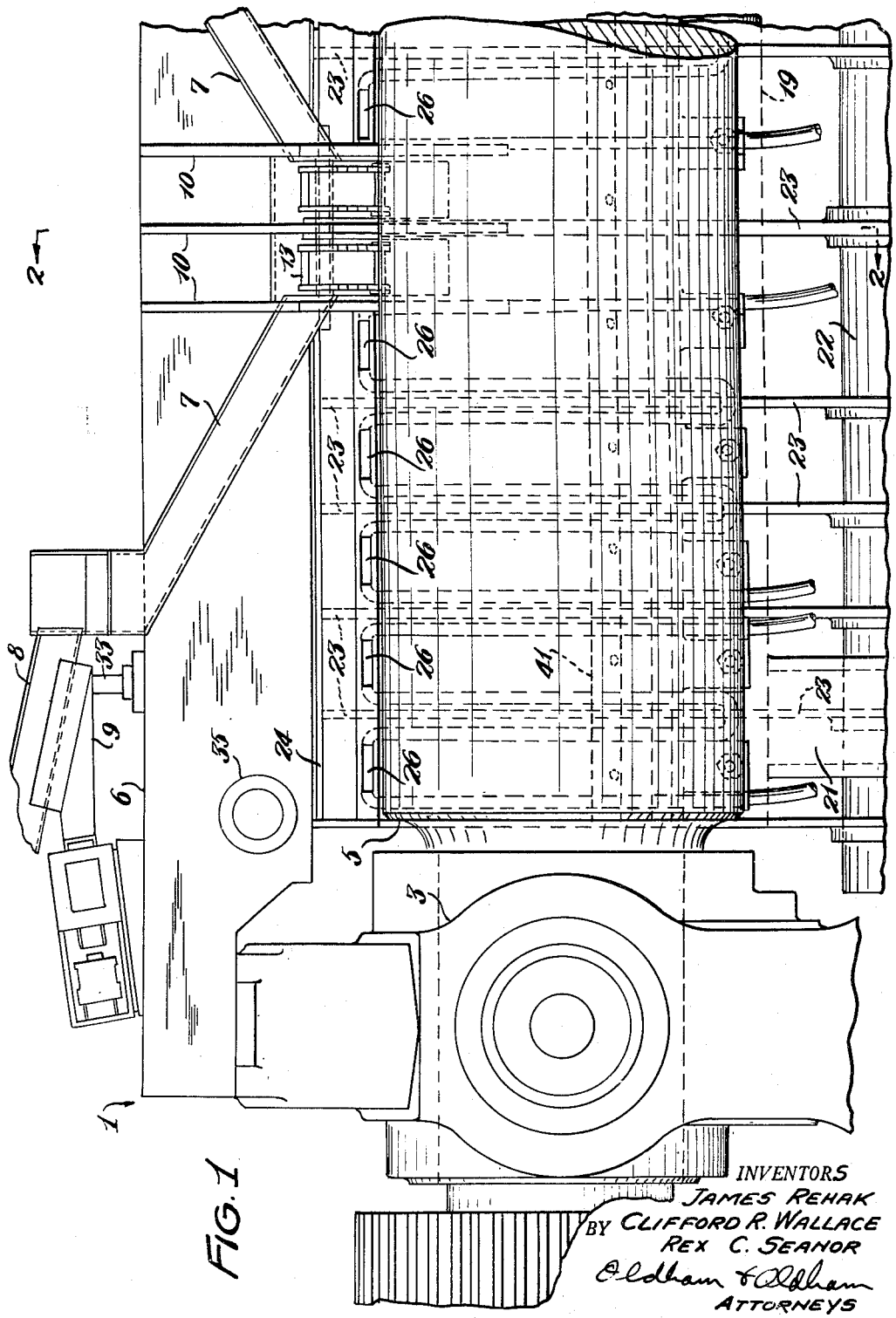
Fig. 1 is a fragmentary front elevation of apparatus embodying the principles of the invention.

The present invention, broadly speaking, comprises apparatus for continually mixing plastic material and it includes a base, a smooth surfaced mill roll journaled on the base, a helically grooved work roll journaled on said base and forming a roll bight with the smooth roll, the groove in the grooved roll extending in opposite directions from the axial center of such roll, a two section, concave casement surrounding the grooved roll and closely spaced therefrom when operatively positioned, which casement extends more than 180° around the grooved roll but with the larger casement section being of less than 180° in extent, means for controlling the temperature of at least part of the casement, means for pivotally positioning the larger section of the casement for movement to and from operative association with the grooved roll, means for fixedly securing the smaller casement section in the apparatus as an extension of the larger casement section when operatively positioned, and means for feeding material to the apparatus at the axial center of the grooved roll.

When referring to the use of the apparatus of the invention, the term plastic material will normally be used and it refers to the processing of any suitable type of material that softens and becomes more plastic when subjected to mastication by a pair of mixing rolls. Examples of such types of materials include natural rubber, synthetic rubber, rubber-like materials, vinyl resins, etc.

For a complete understanding of the invention, reference should be had to the details of the structure shown in the accompanying drawings wherein a continuous type of an automatic plastic mixing apparatus is indicated as a whole by the numeral 1. Such apparatus is shown in general by Fig. 1 of the drawings and includes a suitable base 2 that has a pair of housings 3 (only one of which is shown in the drawings) extending therefrom in spaced parallel relation for journaling a working roll 4 and a feed roll 5 therein. The rolls 4 and 5 are position in adjustable parallel relation to provide a "nip" or "bight" therebetween for passage of plastic material therethrough for the desired mixing operation to be performed thereon. Usually the housing 3 also carry on the upper ends thereof a suitable support beam or member 6 that extends therebetween to position desired control apparatus above the pair of rolls 4 and 5 for a purpose to be described hereinafter in more detail. Conventional means (not shown) connect to the rolls 4 and 5 for rotating same.

In order to supply plastic material to the pair of rolls 4 and 5, usually a conventional type of feed or supply apparatus is provided above the housing 3 and it may be carried by the support beam 6. Such means may include feed chutes 7 that extend axially inwardly and downwardly of the apparatus 1 and which may be supplied with any desired plastic material and compounding ingredients by other supply chutes 8. The supply chutes 8 may have agitators, vibrating equipment, or other similar means 9 associated therewith to facilitate flow of material therethrough. The feed chutes 7 terminate intermediate pairs of control plates 10, three of which plates are positioned in spaced parallel relation at the middle of the apparatus 1 to form two feed compartments therebetween. These control plates 10 lie normal to the longitudinal axes of the rolls 4 and 5 and usually are suitably secured to the support beams 6 and extend downwardly therefrom to terminate in a lower surface that is contoured to fit closely around the upper surface of the rolls 4 and 5 immediately adjacent the roll bight formed therebetween. Suitable control gates 11 may be provided in association with the control plates 10 to aid in controlling flow of material therefrom. A notched arm 12 may extend from each of the control gates 11 and engage with a control bar 13 that is positioned between adjacent members of the control plates 10 and engages the notches in the arm 12 to control the gate 11.

*Working roll and casement combination*

Fig. 3 best shows that the working roll 4 is provided with a pair of helically inclined grooves 14 and 15 on the surface of such roll 4 with the grooves 14 and 15 being oppositely inclined and meeting at the center of the roll 4. Suitable journal portions 16 are provided on the ends of the roll 4 for engaging same with the housing 3 in a conventional manner. A center rib 17 is provided on the working roll 4 where the helical grooves 14 and 15 combine and this dividing rib aids in separating the roll into two functional portions whereby the operative capacity of the apparatus of the invention is increased inasmuch as passage of the plastic material axially along the working roll 4 from the center thereof to an end of the roll 4 of a conventional length roll is normally sufficient for mixing the desired ingredients together, or for plasticizing the material processed.

The actual mixing operation in the apparatus of the invention is largely made possible by and effected through a normally stationary casement indicated as a whole by the numeral 18, which is positioned in spaced but encompassing relation to the working roll 4 and which is over 180° in arcuate length. This casement 18 extends the operative length of the roll 4, as shown in Fig. 4, but leaves space adjacent each end of the roll to permit discharge of the mixed, or plasticized material processed by the apparatus. One edge of the casement terminates immediately adjacent and below the bight formed between the rolls 4 and 5 for receiving any plastic material passing therebetween. The casement 18 thus confines the plastic material being processed between the adjacent surfaces of the casement and the rotating peripheral surface of the working roll. Obviously, appreciable pressures are built up intermediate such working roll 4 and casement 18, and the material being processed is subjected to the desired masticating or kneading action by being passed between the roll bight and by the relative rotary movement between the working roll 4 and the confining casement 18, particularly due to the grooves 14 and 15 provided on the surface of the working roll 4.

As another feature of the invention, the casement 18 is divided into two longitudinally extending sections 19 and 20. The casement section 19 is of relatively short arcuate length and is fixedly positioned immediately adjacent the lower surface of the working roll 4 under the roll bight by means of a suitable bracket 21 or similar member usually secured to or carried by the base 2. The casement section 20 is of slightly less than 180° in arcuate length and is pivotally positioned adjacent the rear portion of the apparatus 1 by a shaft 22. This shaft 22 is in journaled engagement with any desired number of reinforcing flanges or webs 23 suitably welded to, or otherwise secured to and extending substantially normally from longitudinally spaced portions of the rear, lower surface of the casement section 20 to reinforce same. A reinforcing plate 24 of any desired longitudinal length may be carried by and extend between the rear surfaces of the webs 23 to further reinforce the casement section 20, if desired.

Fig. 4 of the drawings best shows that the casement section 20 usually is formed from a solid flat metal plate that has been rolled to arcuate shape and that has a plurality of cooling ports or bores 25 provided therein and extending from front to rear thereof. These bores 25 thus can easily be provided by drilling the plate from edge to edge prior to rolling same to the desired shape. In order to complete cooling circuits through the adjacent bores 25 formed in the metal plate, adjacent pairs of such bores are connected by milled off end sections of the plate and suitable cover plates 26 are secured thereover to seal the connection between the adjacent pairs of the bores and provide closed circuits for flow of cooling fluid through the casement. Any desired type of flexible connecting hoses 126 can be connected to the different ports 25 provided in the movable casement section 20 for supplying cooling, or if desired, heating fluid thereto. Pairs of such hoses 126 connect to each of the separate circuits provided at longitudinally spaced parts of the casement 20. In some instances, it may be desirable to provide heating fluid initially in the apparatus of the invention, when starting the apparatus, at least in the center section of same where the plastic material being processed is first contacted by the pair of rolls 4 and 5. After the apparatus has been satisfactorily warmed the operating temperature conditions could be varied, or controlled in any desired manner so that the material being processed can be cooled or heated, or be subjected to heating temperatures and to cooling temperatures at different portions thereof as the material is masticated in and passed through the apparatus of the invention, and the temperature of such material itself increases.

The mastication of plastic material in the apparatus of the invention is greatly facilitated by the provision of different depths, and possibly widths in the helical grooves 14 and 15 at different axially spaced portions of the working roll 4. Thus the drawings in Fig. 4 show that grooves 14a and 15a are deeper than grooves 14b and 15b, respectively, provided in the working roll 4 and as many different types of grooves may be provided as are practical in the limited axial space provided for movement of plastic material through the apparatus of the invention. Usually the heating or cooling action provided in the movable casement section 20 is correlated to the effective depths or areas of the different grooves provided in the working roll so that the temperatures of the adjacent portion of the casement section 20 facilitate the desired working, or mastication of plastic material in the parts of the helical grooves 14 and 15 immediately adjacent such heated or cooled section of the casement. Relatively wide and deep discharge grooves 14c and 15c are provided at the ends of the roll 4.

Control of position of movable casement section

Figure 2:
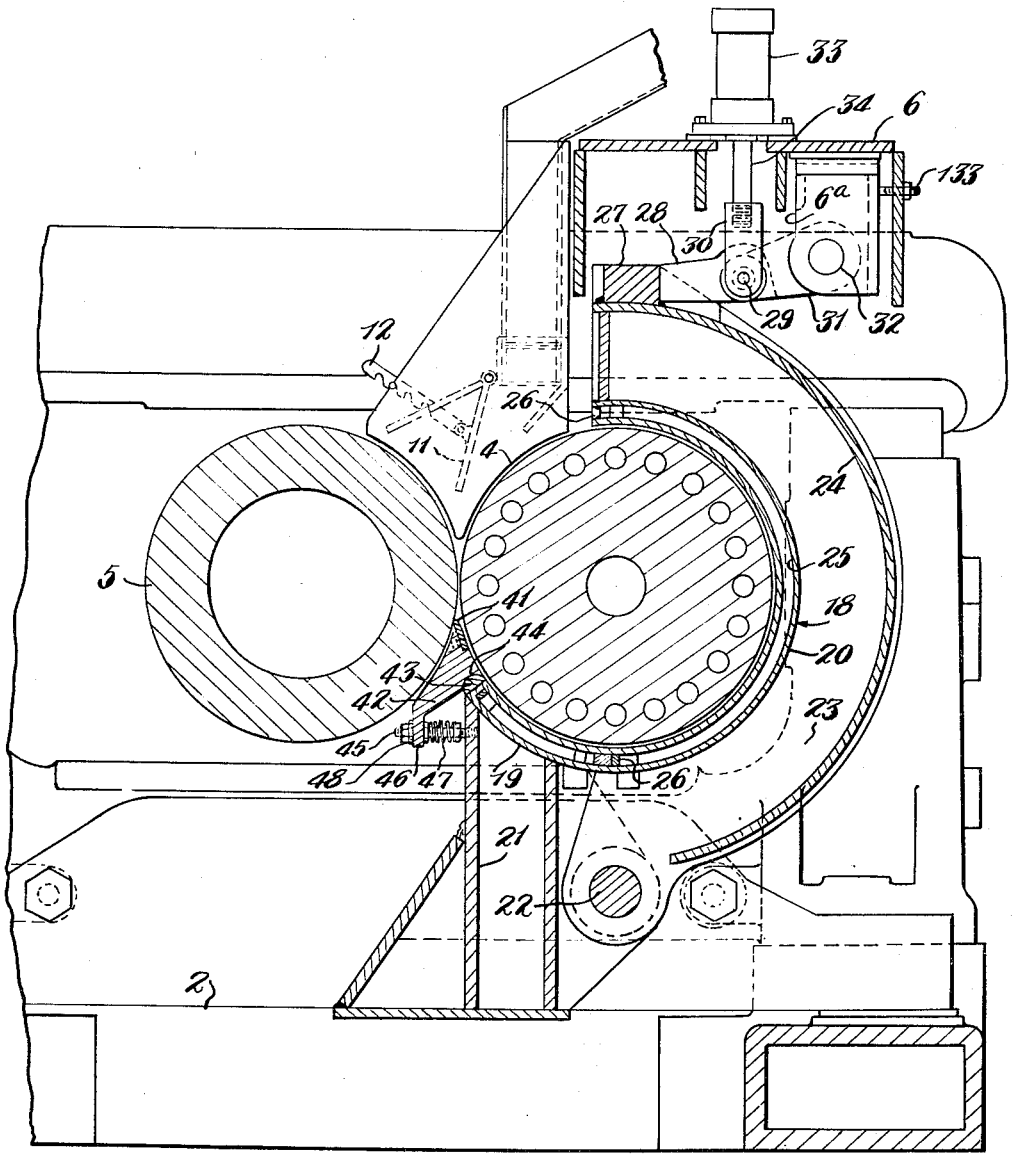
Fig. 2 is a vertical section of the apparatus of Fig. 1 taken on line 1—1 thereof with the feed chutes being shown in elevation.

In order to secure the movable casement section 20 in desired fixed relation to the working roll 4, a suitable block 27 is welded or otherwise secured to the upper surface of the reinforcing plate 24 at the front portion thereof, as indicated in Fig. 2. A control link 28 is adapted to engage at one end with a side edge surface of the block 27. The other end of the control link 28 is pivotally carried by a pin 29 that is in turn carried by a clevis 30. At least one additional control link 31 is engaged at one end to the pin 29 whereas the opposite end of the control link 31 is secured to a control shaft 32 journaled on a bracket 6a or other suitable member slidably carried by the support beam 6 to the rear of the block 27 whereby such end of the control link 31 is fixedly positioned. The control links 28 and 31 are combined to form a toggle by the clevis 30 and the position and action of such toggle is controlled by means of a suitable member, such as a hydraulic cylinder 33 which usually is secured to the control beam 6. A piston 34 is connected between the hydraulic cylinder 33 and the clevis 30 so that fluid flow in the cylinder 33 actuates the toggle. This toggle determines whether the movable casement section 20 is secured in position adjacent the working roll 4 or whether such casement section is free for pivotal movement away from association with the working roll. The effective position of the toggle, when locked, is adjustable by means of the slidably mounted bracket 6a the position of which is controlled by stop screws 133 engaged with the beam 6.

Fig. 5 best shows a positive type of "break-away" means provided for urging the movable casement section 20 away from association with the working roll 4. Such means are shown as comprising a hydraulic cylinder 35 that is suitably secured to and carried by the support beam 6. A piston 36 protrudes from such hydraulic cylinder 35 and is controlled thereby, which piston 36 is adapted to abut against a block 37, or other equivalent member, suitably secured to, or formed on the outer surface of the reinforcing plate 24. Hence force set up by such piston 36 can be transmitted to the movable casement section 20 and be used to rock or swing same back away from engagement with the working roll 4. The action of the cylinder 35 is controlled by conventional means (not shown). Only a relative limited arcuate movement of such casement section will permit plastic material positioned in engagement with the working roll 4 to be removed from the apparatus readily and the apparatus can be cleaned easily and conveniently. Inasmuch as many of the plastic compounds processed in the apparatus of the invention may have colored pigments associated therewith, it is necessary that the apparatus be thoroughly cleaned intermediate runs of different materials in the apparatus.

It will be appreciated that the working roll 4 and the feed roll 5 may be cooled, if necessary. Such cooling of the rolls in a mill of this type is conventional practice and may be effected in any desired manner. Fig. 4 shows that bore 38 of the roll 4 connects to ports 39 that connect to longitudinally extending bores 40 provided in the roll adjacent the periphery for circulation of cooling fluid therethrough. A plurality of ports 39 are provided to connect individually to the bores 40. Similar ports (not shown) would connect to the bores 40 at the opposite end of the roll 4. Usually the bore 38 is sealed or closed intermediate the ends of the roll 4 to separate the inlet and outlet ends thereof.

Mixing or working control device

Fig. 2 of the drawings best shows that a suitable type of a control knife 41 normally should be positioned intermediate the rolls 4 and 5 below the roll bight. This knife 41 may extend substantially the complete length of the working surfaces of the roll 5 and is resiliently held thereagainst. Such knife 41 is positioned on a carrier bar 42 that is provided with a concave surface 43 on a base portion thereof. The surface 43 is complementary to a curved surface 44 provided on the front edge portion of the fixed casement section 19 so that the block 42 is positioned on the casement for limited arcuate movement. A control bolt 45 is engaged with a protruding finger 46 formed on the block 42 on an opposite portion thereof with relation to the surface 43 than the knife 41. Such bolt 45 is adjustably engaged with a fixed member, such as the bracket 21, and may have a spring 47 compressed between such finger 46 and bracket 44 so that the spring 47 continually urges the knife 41 to move away from the surface of the roll 5. The normal operating position for the knife 41 is controlled by a nut 48 engaged with the bolt 46 and bearing on the end of the spring 47.

The plastic material processed in the apparatus of the invention can be removed therefrom at the ends of the working roll 4 by any conventional means. Inasmuch as plastic material is fed to the apparatus at the center thereof and flows axially outwardly of the apparatus in equal amounts, it is possible to avoid any resultant end thrust in the working roll and this simplifies the design and use of the apparatus of the invention.

In some instances, it may be desirable to process material through the apparatus of the invention more than once before ultimately withdrawing same from the apparatus. Thus plastic material could flow through the apparatus automatically and continuously by returning material discharged from the apparatus to the feed chutes. Or, the apparatus may merely have plastic material circulated say, for example, twice therethrough with different compounding ingredients added each time. Of course, the operator of the machine could withdraw plasticized or compounded material from the apparatus continuously when feeding unprocessed material thereto continuously.

The apparatus of the invention can be used for plasticizing material to be used in a manufacturing or fabricating process, or it may be used as a compounding, or mixing apparatus, as desired.

The toggle arms 28 and 31 will limit rearward movement of the casement section 20 and, when actuated, will swing the casement section up to operative relation with the working roll 4.

It will be appreciated that conventional rubber mixing mills in existence today can be converted to a mill of the invention by substituting the working roll 4 of the invention for one of the rolls in the mixing mill, adding the casement sections and controls therefor, and the support beam 6 or associated means to the original mill.

It will be appreciated that any number of different fluid circuits may be provided in the movable casement section 20 and that usually such sections would be maintained at equal temperatures in the corresponding axial portions of the casement.

The fixedly positioned casement section 19 may have cooling or control circuits provided therein or not, as desired.

The different depths of the grooves 14a and 15a with relation to the grooves 14b and 15b are shown in somewhat exaggerated form in the drawings. The portions 14c and 15c of the roll 4 may be considered to be merely reduced diameter sections of the roll at the ends of the grooved sections of same, and they provide plastic material for discharge from the apparatus.

The housings 3 may be considered to be part of the base 2 so that the mill rolls may be said to be journaled on the base, if desired.

Fig. 1 best shows that the plates 26 are narrower than the edges of the casement section 20 and this simplifies closing the connection between ends of adjacent bores 25.

From the foregoing it will be seen that a novel type of a plastic mixing apparatus has been provided, which apparatus has desirable operative properties and can easily be claimed so that the objects of the invention are achieved.

While on complete embodiment of this invention has been disclosed herein, it will be appreciated that modification of this particular embodiment of the invention may be resorted to without departing from the scope of the invention as defined by the appended claims.

What we claim is:

1. Apparatus for mixing rubber or other plastic material and including a base, a smooth mill roll journaled on said base, a helically grooved roll journaled on said base and forming a bight with the said smooth roll, and a plate-like casement of arcuate contour surrounding the grooved roll, said casement having a plurality of bores extending therethrough in the direction of the arc therein, edge portions of said casement narrower than the casement edge being removed to connect ends of adjacent bores, and cover plates secured to said casement over the removed edge portions of same to seal over the connections between adjacent bores and form a connection therebetween.

2. Apparatus as in claim 1 wherein said casement is made of a solid block of metal of uniform thickness throughout, and reinforcing flanges extend substantially normally from the rear surface of said casement to reinforce it, said reinforcing flanges also being normal to the longitudinal axis of said casement.

3. Apparatus for mixing rubber or other plastic material and including a mill roll, a plate-like casement of arcuate contour surrounding said roll, said casement having a plurality of bores extending therethrough in the direction of the arc therein, edge portions of said casement being removed to connect ends of adjacent bores, and cover plates secured to said casement over the removed edge portions of same to bridge over the ends of adjacent bores and form a connection therebetween to provide a fluid flow path in said casement between adjacent bores.

4. Apparatus for mixing rubber and other plastic material and including mill roll, a plate-like casement of arcuate contour surrounding said roll, said casement having a plurality of bores extending therethrough in the direction of the arc therein, edge portions of said casement narrower than the casement edge being removed to connect ends of adjacent bores, cover plates secured to said casement over the removed edge portions of same to seal over the connection between adjacent bores and form a connection therebetween, said casement being made of a solid block of metal of uniform thickness throughout, and reinforcing flanges extending substantially normally from the rear surface of said casement to reinforce it.

References Cited in the file of this patent

UNITED STATES PATENTS

| Number | Name | Date |
|---|---|---|
| 72,393 | Hale | Dec. 17, 1867 |
| 1,996,971 | Murphy | Apr. 9, 1935 |
| 2,264,237 | Brown | Nov. 25, 1941 |
| 2,433,936 | Tornberg | Jan. 6, 1948 |
| 2,460,831 | Kovacs | Feb. 8, 1949 |
| 2,519,834 | Hanson et al. | Aug. 22, 1950 |
| 2,537,395 | Brown | Jan. 9, 1951 |
| 2,551,872 | Brown | May 8, 1951 |
| 2,663,901 | Hale et al. | Dec. 29, 1953 |